United States Patent
Pechtold

(10) Patent No.: US 7,484,540 B2
(45) Date of Patent: Feb. 3, 2009

(54) LIQUID HYDROGEN STORAGE TANK WITH REDUCED TANKING LOSSES

(75) Inventor: Rainer Pechtold, Russelsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 257 days.

(21) Appl. No.: 11/341,543

(22) Filed: Jan. 27, 2006

(65) Prior Publication Data
US 2007/0175903 A1      Aug. 2, 2007

(51) Int. Cl.
*B65B 1/20* (2006.01)
(52) U.S. Cl. .............................. 141/82; 141/11; 141/69; 141/83
(58) Field of Classification Search .................. 141/82, 141/11, 69, 83
See application file for complete search history.

(56) References Cited

U.S. PATENT DOCUMENTS

| | | | |
|---|---|---|---|
| 6,619,336 B2 * | 9/2003 | Cohen et al. ................... | 141/83 |
| 6,918,430 B2 * | 7/2005 | Myasnikov et al. ..... | 165/104.12 |
| 2004/0182141 A1 * | 9/2004 | Bezerko ..................... | 73/118.1 |
| 2005/0130009 A1 * | 6/2005 | Hasegawa et al. .............. | 429/34 |
| 2005/0139493 A1 * | 6/2005 | Myasnikov et al. ............ | 206/7 |
| 2006/0076076 A1 * | 4/2006 | Darling et al. ................ | 141/82 |
| 2007/0020497 A1 * | 1/2007 | Ryoichi et al. ................ | 429/32 |

* cited by examiner

*Primary Examiner*—Khoa D Huynh

(57) ABSTRACT

A liquid hydrogen storage system having minimized tanking losses. Hydrogen is discharged from a liquid hydrogen tank through connector piping of a filling connector to a discharge pipe and then to an external device, such as a fuel cell. As such, the connector piping is maintained at a cryogenic temperature substantially that of liquid hydrogen. During refilling of the tank through the already cryogenically cold connector piping there is substantially reduced evaporation of the liquid hydrogen provided by a liquid hydrogen tank station.

3 Claims, 2 Drawing Sheets

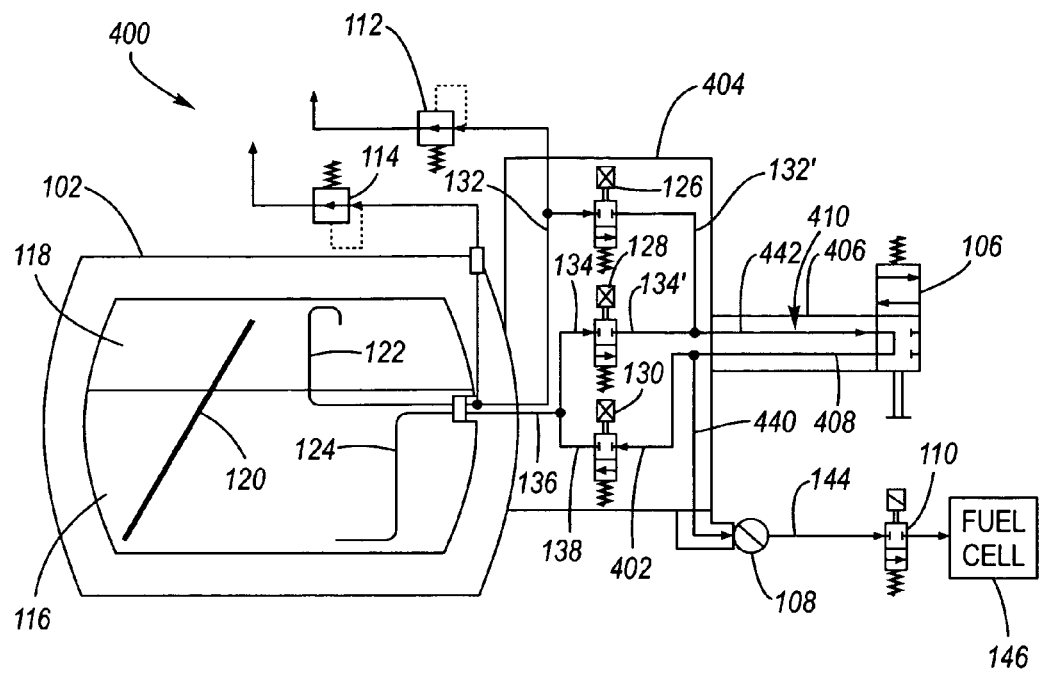
*Fig. 4*
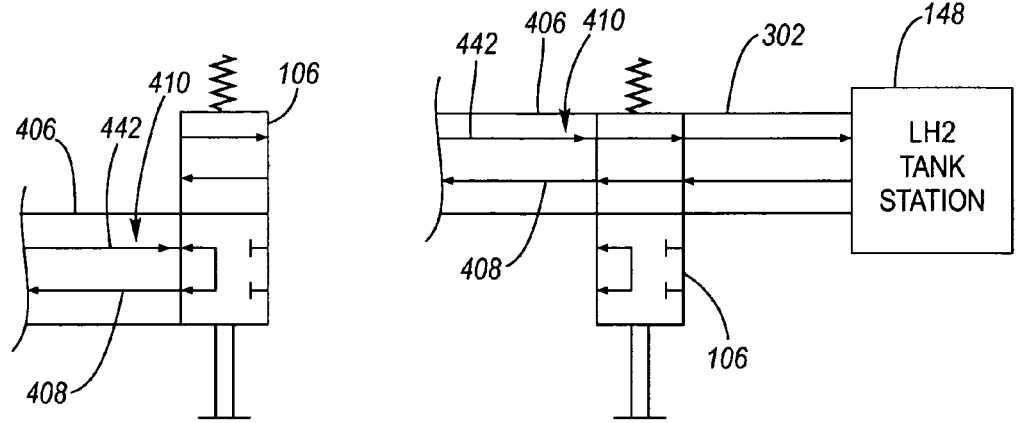
*Fig. 5A*   *Fig. 5B*

LIQUID HYDROGEN STORAGE TANK WITH REDUCED TANKING LOSSES

TECHNICAL FIELD

The present invention relates generally to liquid hydrogen storage tanks and more specifically to a method of reducing gaseous hydrogen losses when a liquid hydrogen storage tank is refilled with liquid hydrogen.

BACKGROUND OF THE INVENTION

Many systems require a hydrogen supply for operation as, for example, fuel cells. If the fuel cell system is in a motor vehicle, for example, the hydrogen utilized by the fuel cell system is stored in, preferably, liquid form in a liquid hydrogen storage system comprised of a liquid hydrogen storage tank and associated components such as, for example valves and pipes, located within the motor vehicle. In order to maintain the hydrogen in a substantially liquid form in the liquid hydrogen storage tank, the liquid hydrogen must be kept at cryogenic temperatures, temperatures below minus two hundred fifty degrees Celsius. When it is necessary to refill the liquid hydrogen storage tank located within the motor vehicle at, for example, a liquid hydrogen tank station, liquid hydrogen flows from the liquid hydrogen tank station to the liquid hydrogen storage tank through connector piping of a filling connector of the liquid hydrogen storage system connecting the liquid hydrogen storage tank to the liquid hydrogen tank station. At the start of the refilling process, the connector piping of the liquid hydrogen storage system connecting the liquid hydrogen storage tank to the liquid hydrogen tank station may be at higher temperature than the liquid hydrogen being transported from the liquid hydrogen tank station to the liquid hydrogen storage tank. The higher temperature of the connector piping causes a substantial portion of the liquid hydrogen being transported to evaporate. The gaseous hydrogen produced by evaporation prevents the liquid hydrogen storage tank from filling with liquid hydrogen and flows back to the liquid hydrogen tank station after passing through the liquid hydrogen storage tank. After a few minutes of refilling, the connector piping becomes cooled by the liquid hydrogen being transported to a temperature such that liquid hydrogen reaches the liquid hydrogen storage tank and the liquid hydrogen storage tank can then be filled with liquid hydrogen.

FIG. 1 is an example of a prior art liquid hydrogen storage system 100 suitable for use with a fuel cell system in a motor vehicle. The liquid hydrogen storage system 100 is composed of liquid hydrogen storage tank 102, cryo-block 104, filling connector 104', cryo-coupling valve 106, heat exchanger 108, shut-off valve 110, safety valve 112, and boil-off valve 114. Liquid hydrogen storage tank 102 contains hydrogen; a portion 116 thereof in liquid form and a portion 118 thereof in gaseous form along with level sensor 120 and pipes 122, 124. Cyro-block 104 consists of gas valve 126, liquid valve 128, filling valve 130, and pipes 132-140. For fuel cell system operation, gaseous and liquid hydrogen in discharge pipe 140 flows through energized heat exchanger 108 into pipe 144 through shut-off valve 110, which is connected to a fuel cell system 146. Filling connector 104' consists of piping 145 in the form of pipes 138" and 142 between cyro-block 104 and cryo-coupling valve 106. Cryo-coupling valve 106 connects to a liquid hydrogen tank station (see FIG. 3B) to refill the liquid hydrogen storage tank 102.

FIG. 2A depicts valves 110, 126, 128, and 130 in the closed position whereas FIG. 2B depicts valves 110, 126, 128, and 130 in the open position. FIG. 3A depicts the closed position of cryo-coupling valve 106 when the liquid hydrogen storage system 100 is not connected to a liquid hydrogen tank station; while FIG. 3B depicts the open position of cryo-coupling valve 106 when the liquid hydrogen storage system 148 is connected to a liquid hydrogen tank station via coupling 302.

Liquid hydrogen storage system 100 includes a discharge mode of operation and a refilling mode of operation, wherein when utilized in a motor vehicle the discharge mode of operation as two sub-modes, parked and driving modes. In parked mode, all valves 106, 110, 126, 128, and 130 are closed and heat exchanger 108 is not energized.

In driving mode, if the pressure in liquid hydrogen storage tank 102 is above a predetermined pressure, gaseous hydrogen 118 flows into pipes 122 and 132 through open gas valve 126 into pipe 132' and discharge pipe 140 to energized heat exchanger 108. After passing through energized heat exchanger 108, gaseous hydrogen flows into pipe 144 and through open shut-off valve 110 to the fuel cell system 146. Valves 106, 128 and 130 are in the closed position during this time.

Otherwise, in driving mode, if the pressure in liquid hydrogen storage tank 102 is below a predetermined pressure, liquid hydrogen 116 flows into pipes 124, 136, and 134 through open liquid valve 128 into pipe 134' and discharge pipe 140 to energized heat exchanger 108. After passing through energized heat exchanger 108, gaseous hydrogen flows into pipe 144 and through open shut-off valve 110 to the fuel cell system. Valves 106, 126 and 130 are in the closed position during this time.

In refilling mode, there will either be a small amount or no liquid hydrogen 116 in liquid hydrogen storage tank 102. Hence, liquid hydrogen storage tank 102 will contain substantially gaseous hydrogen 118. A liquid hydrogen tank station 148 is connected to open cryo-coupling valve 106 via coupling 302 as depicted in FIG. 3B. Liquid hydrogen flows from the liquid hydrogen tank station 148 into the filling connector 104' through the connector piping 145 via pipe 138", through pipe 138', through open filling valve 130, and through pipes 138, 136 and 124 to the liquid hydrogen storage tank 102. Gaseous hydrogen 118 flows into pipes 122 and 132 through open gas valve 126 through pipe 132', into the filling connector 104' through the connector piping 145 via pipe 142, and through cryo-coupling valve 106 into coupling 302 back to the liquid hydrogen tank station. Heat exchanger 108 is de-energized and shut-off valve 110 is closed during this mode.

At the start of the refilling process, the connector piping 145 (pipes 138" and 142) of the filling connector 104' are at a higher temperature than the liquid hydrogen being transported from the liquid hydrogen tank station to the liquid hydrogen storage tank 102. The higher temperature of the connector piping causes a substantial portion of the liquid hydrogen being transported to evaporate. The gaseous hydrogen produced by evaporation flows through pipes 138" and 138', open filling valve 130, and through pipes 138, 136 and 124 and enters the liquid hydrogen storage tank 102 as gaseous hydrogen 118 and prevents the liquid hydrogen storage tank from filling with liquid hydrogen, whereupon the gaseous hydrogen returns to the liquid hydrogen tank station as previously described. After a few minutes of refilling, the connector piping 145 (pipes 138" and 142) are cooled sufficiently by the hydrogen being transported so as to be at a cryogenic temperature such that liquid hydrogen reaches the liquid hydrogen storage tank 102 as previously described and the liquid hydrogen storage tank can then be filled with liquid hydrogen.

The gaseous hydrogen produced through evaporation of the transported liquid hydrogen from the liquid hydrogen tank station due to the temperature of the connector piping 145 flowing back to the liquid hydrogen tank station, as previously described, may be recovered or just vented to the atmosphere. If the gaseous hydrogen is recovered, energy must be expended to re-liquefy the gaseous hydrogen. If the gaseous hydrogen is vented to the atmosphere, it is lost. Hence, if the amount of gaseous hydrogen produced by the refilling process through evaporation can be reduced, a significant amount of energy and hydrogen can be saved.

Accordingly, what is needed in the art is a method of reducing gaseous hydrogen losses when the liquid hydrogen storage tank is refilled with liquid hydrogen.

SUMMARY OF THE INVENTION

The present invention is an apparatus and method of reducing gaseous hydrogen losses when a liquid hydrogen storage tank is refilled with liquid hydrogen. The gaseous hydrogen losses are produced by the refilling process through evaporation of the transported liquid hydrogen from a liquid hydrogen tank station to a liquid hydrogen storage system due to the temperature of the connector piping of the filling connector of the liquid hydrogen storage system which connect to the liquid hydrogen tank station being substantially greater than the temperature of the transported liquid hydrogen from the liquid hydrogen tank station to the liquid hydrogen storage system.

In the practice of the present invention, the temperature of the connector piping of the filling connector of a liquid hydrogen storage system which connect to a liquid hydrogen tank station are operationally maintained at a cryogenic temperature substantially that of the transported liquid hydrogen from the liquid hydrogen tank station to the liquid hydrogen storage system. During operation, gaseous and liquid hydrogen within a liquid hydrogen storage tank are conveyed through the connector piping of the filling connector even while the liquid hydrogen storage system is not connected to the liquid hydrogen tank station for refilling so as to thereby maintain the connector piping at a cryogenic temperature substantially that of liquid hydrogen, and thereby substantially reducing evaporation of transported liquid hydrogen from the liquid hydrogen tank station to the liquid hydrogen storage system when the liquid hydrogen storage system is connected to a liquid hydrogen tank station to refill the liquid hydrogen storage tank. As such, the present invention may be retrofitted into prior art liquid hydrogen storage systems through modification of prior art liquid hydrogen storage systems to incorporate the present invention.

Accordingly, it is an object of the present invention to provide the temperature of the connector piping of a filling connector of a liquid hydrogen storage system at cryogenic temperature during operation so that at the time of refilling, the temperature of the pipes of the filling connector are substantially at liquid hydrogen temperature.

This and additional objects, features and advantages of the present invention will become clearer from the following specification of a preferred embodiment.

BRIEF DESCRIPTION OF THE DRAWINGS

FIG. 4 is an example of a liquid hydrogen storage system according to the present invention.

FIG. 5A is a depiction of a cryo-coupling valve of FIG. 4 in a closed position.

FIG. 5B is a depiction of a cryo-coupling valve of FIG. 4 in an open position.

DESCRIPTION OF THE PREFERRED EMBODIMENT

Figure 1:
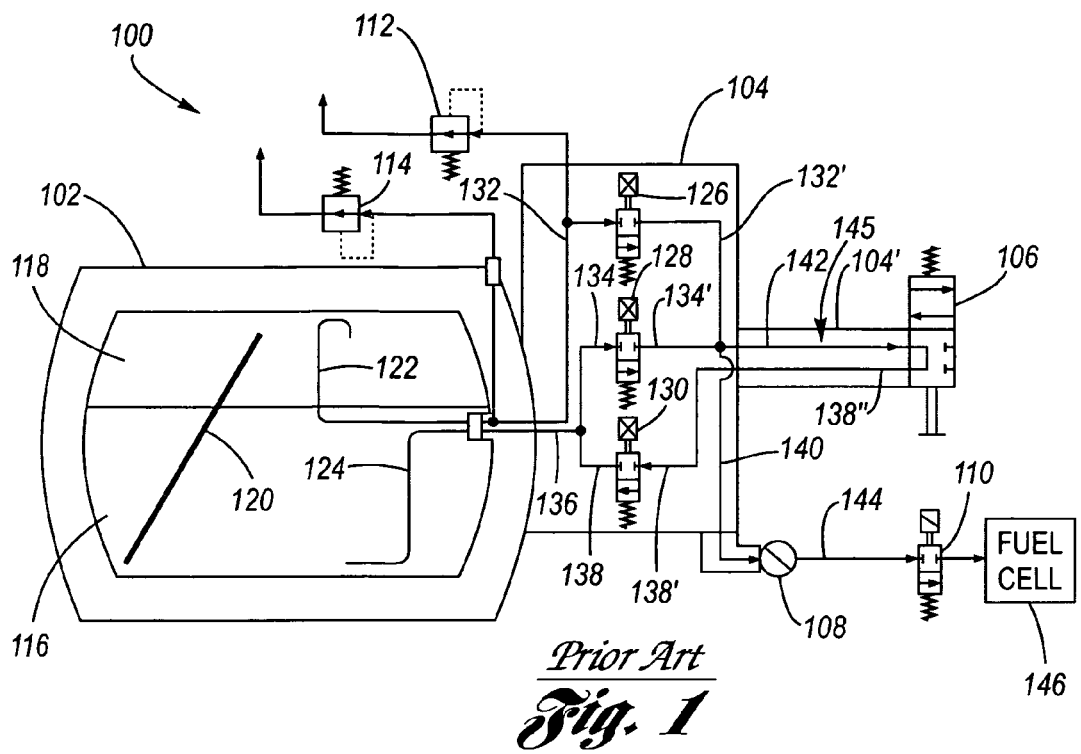
FIG. 1 is an example of a prior art liquid hydrogen storage system suitable for use in a motor vehicle.

FIG. 4 is an example of a liquid hydrogen storage system 400 according to the present invention. The example of FIG. 4, by way of exemplification, retrofits the present invention into the prior art liquid hydrogen storage system 100 of FIG. 1 through modifying the prior art liquid hydrogen storage system of FIG. 1 to incorporate the present invention, wherein like parts are shown with like reference numerals.

The liquid hydrogen storage system 400 is composed of liquid hydrogen storage tank 102, cryo-block 404, filling connector 406, cryo-coupling valve 106, heat exchanger 108, shut-off valve 110, safety valve 112, and boil-off valve 114. Liquid hydrogen storage tank 102 contains hydrogen; a portion 116 thereof in liquid form and a portion 118 thereof in gaseous form along with level sensor 120 and pipes 122, 124. Cryo-block 404 consists of gas valve 126, liquid valve 128, filling valve 130, and pipes 132, 132', 134, 136, 138, 402, and discharge pipe 440.

Figure 3A:
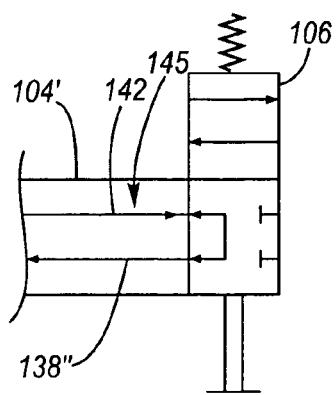
FIG. 3A is a depiction of a cryo-coupling valve of FIG. 1 in a closed position.
Figure 3B:
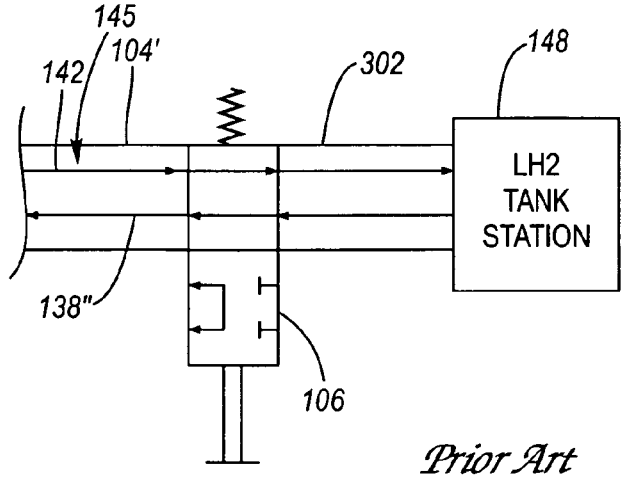
FIG. 3B is a depiction of a cryo-coupling valve of FIG. 1 in an open position.

To operatively deliver hydrogen from the liquid hydrogen storage tank 102 to an external device such as a fuel cell system 146, gaseous and liquid hydrogen flows through connector piping 410 of the filling connector 406 via, by way of example, pipes 442 and 408, then through discharge pipe 440, through energized heat exchanger 108, and into pipe 144 through shut-off valve 110, which is connected to the fuel cell system 146. The filling connector 406 is located between cyro-block 144 and cryo-coupling valve 106, and connects to a liquid hydrogen tank station 148 (see FIG. 3B) to refill the liquid hydrogen storage tank 102 through the connector piping 410 of the filling connector 406.

Figure 2A:
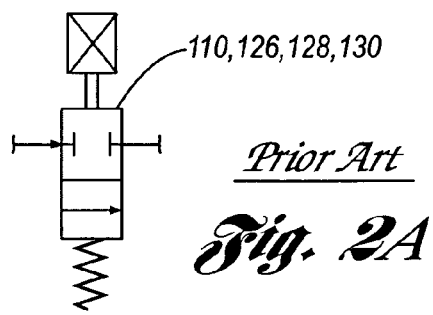
FIG. 2A is a depiction of a first valve of FIG. 1, and applicable to FIG. 4, in a closed position.
Figure 2B:
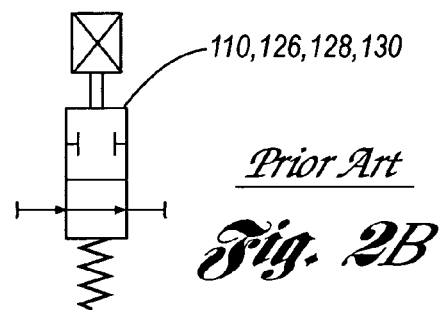
FIG. 2B is a depiction of a first valve of FIG. 1, and applicable to FIG. 4, in an open position.

FIG. 2A also serves as a depiction for FIG. 4, where the valves 110, 126, 128, and 130 are in the closed position; whereas FIG. 2B also serves as a depiction for FIG. 4, where the valves 110, 126, 128, and 130 are in the open position.

FIG. 5A depicts the closed position of cryo-coupling valve 106 when the liquid hydrogen storage system 400 is not connected to a liquid hydrogen tank station; while FIG. 5B depicts the open position of cryo-coupling valve 106 when the liquid hydrogen storage system 400 is connected to a liquid hydrogen tank station 148 via coupling 302.

The liquid hydrogen storage system 400 is composed of liquid hydrogen storage tank 102, cryo-block 404, filling connector 406, cryo-coupling valve 106, heat exchanger 108, shut-off valve 110, safety valve 112, and boil-off valve 114 liquid hydrogen storage tank 102 contains hydrogen; a portion 116 thereof in liquid form and a portion 118 thereof in gaseous form along with level sensor 120 and pipes 122, 124. Cryo-block eyfebleek 404 consists of gas valve 126, liquid valve 128, filling valve 130, and pipes 132, 132, 134, 136, 138, 402, and discharge pipe 440.

In driving mode, if the pressure in liquid hydrogen storage tank 102 is above a predetermined pressure, gaseous hydrogen 118 flows into pipes 122 and 132 through open gas valve 126 into pipe 132', then through the connector piping 410 of the filling connector 406 via pipes 442 and 408, and then through discharge pipe 440 to energized heat exchanger 108. After passing through energized heat exchanger 108, gaseous hydrogen flows into pipe 144 and through open shut-off valve 110 to the fuel cell system. Valves 106, 128 and 130 are in the closed position during this time.

Otherwise, in driving mode, if the pressure in liquid hydrogen storage tank 102 is below a predetermined pressure, liquid hydrogen 116 flows into pipes 124, 136, and 134 through open liquid valve 128 into pipe 134', through the connector piping 410 of the filling connector 406 via pipes 442 and 408, and then through discharge pipe 440 to energized heat exchanger 108. After passing through energized heat exchanger 108, gaseous hydrogen flows into pipe 144 and through open shut-off valve 110 to the fuel cell system. Valves 106, 126 and 130 are in the closed position during this time.

In refilling mode, there will either be a small amount or no liquid hydrogen 116 in liquid hydrogen storage tank 102. Hence, liquid hydrogen storage tank 102 will contain substantially gaseous hydrogen 118. In refilling mode, the liquid hydrogen tank station is connected to open cryo-coupling valve 106 via coupling 302 as depicted in FIG. 5B.

With simultaneous reference to FIGS. 4 and 5B, liquid hydrogen flows from the liquid hydrogen tank station 148 through the coupling 302 through cryo-coupling valve 106, into the connector piping 410 of the filling connector 406 via pipe 408, through pipe 402, open filling valve 130, and through pipes 138, 136 and 124 to the liquid hydrogen storage tank 102. Gaseous hydrogen 118 flows into pipes 122 and 132 through open gas valve 126 into pipe 132' into the connector piping 410 of the filling connector 406 via pipe 442, through cryo-coupling valve 106 into coupling 302 back to the liquid hydrogen tank station 148. Heat exchanger 108 is de-energized and shut-off valve 110 is closed during this mode.

Because the flow of hydrogen during driving mode includes passage through the connector piping 410 of the filling connector 406, at the start of the refilling process the connector piping (pipes 442 and 408) are at a cryogenic temperature substantially that of the liquid hydrogen being transported from the liquid hydrogen tank station 148 to the liquid hydrogen storage tank 102. The already cryogenically low temperature of the connector piping substantially decreases evaporation of liquid hydrogen being transported from the liquid hydrogen tank station 148 to the liquid hydrogen storage system 400 in comparison to prior art liquid hydrogen storage systems, for example as depicted in FIG. 1. The significantly reduced gaseous hydrogen, compared to prior art liquid hydrogen storage systems, for example as depicted in FIG. 1, produced by evaporation of liquid hydrogen being transported from the liquid hydrogen tank station 148 to the liquid hydrogen storage system 400 flows through pipes 408 and 402, open filling valve 130, and through pipes 138, 136 and 124 and enters the liquid hydrogen storage tank 102 as gaseous hydrogen 118, whereupon the gaseous hydrogen returns to the liquid hydrogen tank station as previously described. The connector piping 410 of the filling connector 406 are further cooled by the liquid hydrogen being transported from the liquid hydrogen tank station 148 to the liquid hydrogen storage system 400, in a substantially shorter time of refilling, compared to prior art liquid hydrogen storage systems, for example as depicted in FIG. 1.

The substantially decreased gaseous hydrogen produced through evaporation, compared to prior art liquid hydrogen storage systems, for example as depicted in FIG. 1, of the transported liquid hydrogen from the liquid hydrogen tank station 148 to the liquid hydrogen storage tank 102 may be recovered or just vented to the atmosphere. Because of the already precooled cryogenically low temperature of the connector piping 410 in the filling connector 406 due to the flow of cryogenic (near liquid hydrogen) temperature hydrogen flowing there through to the fuel cell system 146 during operation (ie., during drive mode as described above), much less energy must be expended to re-liquefy the gaseous hydrogen and much gaseous hydrogen is lost if it is vented to the atmosphere, compared to prior art liquid hydrogen storage systems, for example as depicted in FIG. 1. Hence, the present invention substantially reduces the amount of gaseous hydrogen produced by the refilling process through evaporation thereby saving a significant amount of energy and hydrogen.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for operating a liquid hydrogen storage tank system, comprising the steps of:
   providing a liquid hydrogen storage tank having tank piping for passing liquid and gaseous hydrogen into and out of the storage tank;
   providing a filling connector having connector piping for connecting a liquid hydrogen tank station to the tank piping during filling of the storage tank with liquid hydrogen;
   providing valving for delivering hydrogen from the storage tank to an external device through a discharge pipe;
   filling the tank with liquid hydrogen;
   delivering hydrogen responsive to the valving from the storage tank to the external device by passing the hydrogen through the connector piping to the discharge pipe and then to the external device; and
   refilling the tank by passing liquid hydrogen through the connector piping of the filling connector and then to the tank;
   wherein, said step of delivering precools the connector piping of the filling connector for said step of refilling.

2. The method of claim 1, further comprising:
   said step of delivering comprises passing cryogenic temperature hydrogen through the connector piping of said filling connector, wherein said cryogenic temperature comprises substantially liquid hydrogen temperature; and
   said step of refilling is begun while the connector piping is substantially at said cryogenic temperature.

3. In a liquid hydrogen storage system comprising: a liquid hydrogen storage tank having tank piping for passing liquid and gaseous hydrogen into and out of the storage tank; a filling connector having connector piping for connecting a liquid hydrogen tank station to the tank piping during filling of the storage tank with liquid hydrogen; and valving for delivering hydrogen from the storage tank to an external device through a discharge pipe; an improvement thereto comprising:
   said connector piping being connected to said tank piping so that said valving delivers the hydrogen from the storage tank through said connector piping to said discharge pipe and then to the external device.

* * * * *